June 16, 1953  E. R. LAWSHE  2,642,064
INJECTION DEVICE
Filed April 24, 1951
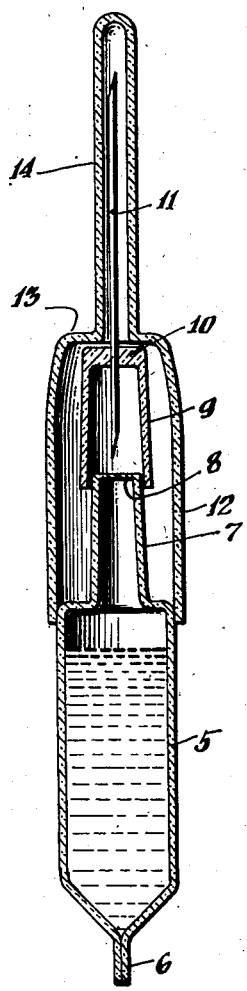
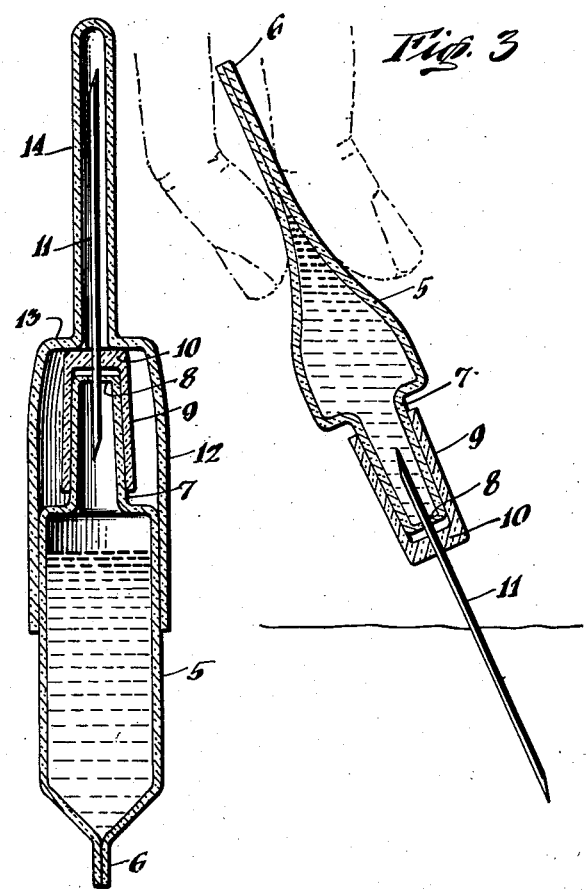
INVENTOR.
Errol R. Lawshe
BY Duell and Kane
ATTORNEYS Patented June 16, 1953

2,642,064

UNITED STATES PATENT OFFICE 2,642,064

INJECTION DEVICE

Errol R. Lawshe, Ridgewood, N. J., assignor to Becton Dickinson and Company, Rutherford, N. J., a corporation of New Jersey Application April 24, 1951, Serial No. 222,610

2 Claims. (Cl. 128—216)

This invention relates to a structurally and functionally improved injection device of the hypodermic type.

It is an object of the invention to furnish an assembly which may, for example, be placed in kits issued to the armed forces and by means of which hypodermic injections may be given with facility even under combat conditions; the present device embracing a unitary assembly the parts of which will be maintained in sterile condition and instantly available for ready use.

A further object is that of providing an injection device which, according to present teachings, will have a one time use and the parts of which may be economically and readily produced in quantity lots; the body of the device being capable of readily receiving and enclosing the desired medicament.

With these and other objects in mind, reference is had to the attached sheet of drawings illustrating one practical embodiment of the invention and in which:

Fig. 1 is a sectional side view of the assembly in its initial condition;

Fig. 2 is a similar view showing the parts of that assembly after they have been potentialized for use; and Fig. 3 is a further sectional view illustrating the disposition of the parts while making an injection.

In these views the numeral 5 indicates the body of the device which initially is in the form of a tube having one open end. That body receives medicament and thereafter the open tube end is closed and sealed as indicated at 6. All parts of the assembly may be formed of plastic. Conveniently the body 5 is produced from polyethylene. Other parts may embrace the same material, involve polystyrene or be otherwise formed. When employing materials of this nature it will be understood that the seal 6 may readily be provided by, for example, utilizing heat and pressure or proceeding in any other fashion to close the end of tube 5.

The opposite or outer end of the tube extends in the form of a neck portion 7, the mouth of which is closed by a perforable diaphragm 8. This diaphragm should conveniently be of thinner gage than the walls of tube 5 and neck 7. In any event, it is preferably integral or at least immovable with respect to the neck portion. As shown that portion may be slightly tapered. This is, in many respects, desirable. However, as will hereinafter be apparent the neck can be truly cylindrical and free from any taper.

Overlapping the tip end of the neck as in Fig. 1 there is the rim of a cup-shaped member 9. The base of the latter is conveniently thickened as indicated at 10. Through this base there extends the body of a double pointed needle 11. The inner end of this needle should lie adjacent the edge of the cup but slightly recessed within the same. The diameter of the cup rim should be slightly in excess of the diameter of the outer end of tip 7. Thus, the parts will bear against each other in their normal positions (Fig. 1) and the inner end of the cannula will, under these circumstances, not contact the diaphragm or pierceable portion 8.

Enclosing the cup 10 as well as neck tip 7 is an actuator in the form of a cap 12 conveniently having a flange portion 13. That flange portion extends inwardly to define an orifice smaller than the diameter of cup 10. The internal diameter of cap 12 is substantially equal to the outer diameter of body 5. These parts in their initial position are slightly overlapped as again shown in Fig. 1. It is apparent that a seal of any desired type might be furnished to prevent any movement of the cap with respect to the tube and to also prevent the entrance of air or foreign materials between these parts. This seal has not been shown in that it might take one of many different forms; seals of this nature being well known in the medical art. Flange 13 is continued in the form of an extension 14 which encloses the outer end of the needle. In this manner all critical parts of the assembly are completely protected and may be maintained in sterile condition for indefinite periods of time.

Assuming the device is to be used, an operator will simply force cap 12 in the direction of the sealed end portion 6 of body 5. In such movement any seal which exists between the rim of the cap and the body of the tube will be broken. If such a seal does not lend itself to that type of manipulation, then the seal may be removed prior to the telescoping of the parts. In any event as the parts are thus moved, flange 13 will bear against the base of cup 10. Therefore cup 10 will be telescoped with respect to neck 7. In such telescoping the inner end of needle 11 will penetrate the perforable portion 8. Therefore the bore of the cannula will be in communication with the chamber containing the medicament. When the side walls of the tip and cup are parallel to their axes a slip fit will exist between these parts. If, as shown, they are slightly tapered or wedge shaped, then, due to the material of which they are preferably composed, they will adapt themselves to one another; the tip 7 being even capable of slight constriction without detriment.

During all of the foregoing operation the critical parts of the assembly have remained in sterile condition as in Fig. 2. Cap 12 may now be withdrawn. Under these circumstances, cup 9 and the cannula mounted thereby will remain in association with the tip. The cap may be discarded and tube 5, if desired, may be compressed while maintaining the unit upright and in order to expel any air within the body 5. Such expulsion will be evidenced by medicament beginning to discharge from the outer end of the needle. Thereupon the outer needle end may be plunged through the epidermis. Under continued squeezing or collapsing of body 5 the medicament will be hypodermically injected. After the injection has been completed the needle is withdrawn, and the entire assembly may be discarded.

Thus, among others, the several objects of the invention as specifically aforenoted are achieved. Obviously numerous changes in construction and rearrangement of the parts might be resorted to without departing from the spirit of the invention as defined by the claims.

I claim:

1. An injection device including in combination a medicament-containing body, a reduced neck extending from said body, a pierceable portion at the outer end of said neck, an uninterrupted cup-shaped member frictionally engaging and mounted for sliding movement on said neck, a double-ended needle extending through, fixed with respect to and solely supported by the base of said cup, said needle having an inner end terminating short of said pierceable portion, a cylindrical actuator slidably contacting and encircling said body, said actuator being spaced from engagement with said cup, a base portion at the outer end of said actuator and overlying the bottom of said cup, said base being formed with an opening through which the needle extends and an enclosing portion mounted by said base to encircle said opening and enclose the outer needle end.

2. An injection device including in combination a medicament-containing body, a reduced neck extending from said body, a pierceable portion at the outer end of said neck, an uninterrupted cup-shaped member frictionally engaging and mounted for sliding movement on said neck, a double-ended needle extending through, fixed with respect to and solely supported by the base of said cup, said needle having an inner end terminating short of said pierceable portion, a cylindrical actuator slidably contacting and encircling said body, said actuator being spaced from engagement with said cup, a base portion at the outer end of said actuator and overlying the bottom of said cup, said base being formed with an opening through which the needle extends, an enclosing portion mounted by said base to encircle said opening and enclose the outer needle end, said neck portion being tapered in an outward direction, the inner face of said cup member being similarly tapered and at least one of said parts being formed of a deformable material such that said cup may be retracted with respect to said neck.

ERROL R. LAWSHE.

References Cited in the file of this patent

UNITED STATES PATENTS

| Number | Name | Date |
|---|---|---|
| 1,236,426 | Greeley | Aug. 14, 1917 |
| 1,522,198 | Marcy | Jan. 6, 1925 |
| 1,687,502 | Marcy | Oct. 16, 1928 |
| 2,371,086 | Watson et al. | Mar. 6, 1945 |

FOREIGN PATENTS

| Number | Country | Date |
|---|---|---|
| 75,287 | Switzerland | Nov. 16, 1917 |